US008416454B2

(12) United States Patent
Rimai et al.

(10) Patent No.: US 8,416,454 B2
(45) Date of Patent: Apr. 9, 2013

(54) METHOD FOR GENERATING PERSONALIZED DOCUMENTS

(75) Inventors: Donald S. Rimai, Webster, NY (US); Chung-Hui Kuo, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 554 days.

(21) Appl. No.: 12/649,374

(22) Filed: Dec. 30, 2009

(65) Prior Publication Data

US 2011/0157611 A1 Jun. 30, 2011

(51) Int. Cl.
*G06F 15/00* (2006.01)
*G06F 3/048* (2006.01)

(52) U.S. Cl.
USPC ............................................ 358/1.9; 715/800

(58) Field of Classification Search .................. 382/306, 382/310, 311, 284, 229, 181; 358/1.18, 1.9; 235/435; 715/244, 252, 815, 800
See application file for complete search history.

(56) References Cited

U.S. PATENT DOCUMENTS

| 5,412,771 | A | 5/1995 | Fenwick | |
|---|---|---|---|---|
| 7,221,810 | B2* | 5/2007 | Andreasson et al. | 382/284 |
| 7,489,416 | B2* | 2/2009 | Ishikawa | 358/1.16 |
| 2001/0048436 | A1 | 12/2001 | Sanger | |
| 2003/0178485 | A1* | 9/2003 | Lee | 235/435 |
| 2003/0185448 | A1* | 10/2003 | Seeger et al. | 382/229 |
| 2003/0210428 | A1* | 11/2003 | Bevlin et al. | 358/1.18 |
| 2005/0069203 | A1 | 3/2005 | Khomo | |
| 2006/0013484 | A1* | 1/2006 | Kono | 382/181 |
| 2006/0179189 | A1 | 8/2006 | Lin | |
| 2006/0218484 | A1* | 9/2006 | Saito et al. | 715/512 |
| 2006/0230004 | A1* | 10/2006 | Handley | 706/12 |

FOREIGN PATENT DOCUMENTS

| EP | 1 089 192 A2 | 4/2001 |
|---|---|---|
| EP | 2 073 527 A1 | 6/2009 |
| WO | WO 97/41513 A1 | 11/1997 |

OTHER PUBLICATIONS

Hodgson et al: "Connecting Characters to Simulate Handwriting", IP.COM Journal, IP.COM.INC., West Henrietta, NY, US, Mar. 1, 1993, XP013092670, ISSN: 1533-0001, the whole document.

Lin et al: "Style-preserving English Handwriting Synthesis", Pattern Recognition, Elsevier, GB, vol. 40, No. 7, Mar. 30, 2007, pp. 2097-2109, XP022009144, ISSN: 0031-3203, DOI: DOI:10.1016/J.PATCOG.2006.11.024, Figures 1, 2, Sections 4., 4.1, 5.2.1.

Michael Kokula: "Automatic Generation of Script Font Ligatures Based on Curve Smoothness Optimization", Electronic Publishing, vol. 7, No. 4, Dec. 1994, pp. 217-229, XP002621118, John Wiley & Sons, the whole document.

* cited by examiner

Primary Examiner — Jerome Grant, II
(74) Attorney, Agent, or Firm — Raymond L. Owens

(57) ABSTRACT

A computer implemented method of producing personalized documents comprising the steps of inputting handwritten alphanumeric characters which are then mapped into at least one set of text characters. A textural document is entered into the computer and is transcribed into a set of text characters corresponding to the input handwritten alphanumeric characters. The document can be printed and will contain text in the handwriting of the person whose alphanumeric characters were used as input.

13 Claims, 5 Drawing Sheets

METHOD FOR GENERATING PERSONALIZED DOCUMENTS

CROSS REFERENCE TO RELATED APPLICATIONS

Reference is made to commonly assigned, co-pending U.S. patent application Ser. No. 12/649,380 by Rimai et al. filed of even date herewith entitled "System for Generating Personalized Documents," the disclosure of which is incorporated herein by reference in its entirety.

FIELD OF THE INVENTION

This invention relates to a method and apparatus for printing customized documents. Specifically, this invention uses digital printing and scanning technology to produce a document of which at least a part is in the handwriting of the individual producing the document.

BACKGROUND OF THE INVENTION

There are many personalized documents generated. For example, Christmas letters often contain family photos. Disney World takes digital pictures of customers on rides and offers to sell them to the customer. Other applications abound. However, there is presently no easy way to generate customized documents today. This is especially problematical if one wants to send a letter or postcard with a photo one took with a caption. For example, custom picture postcards come to mind where one may want to combine a photo one took himself or a purchased picture with a written note and send it to an individual. The problem is compounded when one wants to send similar notes, individually addressed but almost identical, to a number of people. An example might include sending a set of picture postcards to friends and family. A preferred embodiment of the present invention describes a method of producing such cards or documents.

SUMMARY OF THE INVENTION

Digital prints can be stored on a computer. For example, a tourist location may store a number of photos and charge a customer for their purchase. Alternatively, an individual can download his own pictures from a digital camera into the computer. More than one photo can, of course, be used in a document. Alternatively, different photos can be used for different documents if desired. The individual then maps his handwriting into the computer. This can be done using a digitizing tablet similar to that used for many credit card signatures at stores. The customer stores each alphanumeric and maps that to a known letter, thereby defining a set of fonts corresponding to his handwriting. This allows him not only to write a letter in his own handwriting, but to sign the letter. Alternatively, selected portions of the letter or document may be in his own handwriting. The written document is then combined with the photo(s) in the desired manner. For example, picture postcard templates can be generated or stored in the computer and the written and pictorial images pasted onto the template, as desired, to form the document. Creative photos can also be created for this application using known software technology such as Photoshop. Thus, a photo of a person riding a whale, for example, can be produced for use on the card.

The document can be created by typing directly into the computer using the individually generated font. Alternatively, word recognition software can be used to translate spoken words into text, again in the individual's handwriting. Documents can be customized using software such as "Mail Merge". If greater changes are needed, the file can be stored and edited as desired.

As one application, a visitor to a place such as Disney World can combine local photos in one of the theme parks with the personalized verbiage and an address of a recipient, and have the postage imprinted on the card digitally. In addition, the machine software can adjust the postage for the size and weight of the card being printed based on which media tray sources the card. For example, various types of card stock can be inputted into the software and different trays can contain such card stock of varying sizes. By knowing the type of card stock, thereby knowing the weight of the card stock, and the size of the card, the computer can automatically compute the weight of the card and determine the proper postage. Alternatively, the size of the card can be manually inputted into the computer. In another mode of practicing this invention, adjustable guides in a tray holding the card stock can be attached to a sensor that automatically inputs the size of the card into the computer, thereby allowing the weight of the card to be calculated and the proper postage determined. It can then be printed on a coupled printer, including a personal message, postage, and address, or it can be electronically sent to the hotel where the tourist is staying, and printed and mailed from the hotel without the tourist ever having to touch the card.

A preferred embodiment of the present invention includes a computer implemented method of producing personalized documents comprising the steps of inputting handwritten alphanumeric characters which are then mapped into at least one set of text characters. A textural document is entered into the computer and is transcribed into a set of text characters corresponding to the input alphanumeric characters. The document can be printed and will contain text in the handwriting of the person whose alphanumeric characters were used as input.

Another preferred embodiment of the present invention includes a computer implemented method of producing personalized documents comprising the steps of selecting a digital image stored in the computer and selecting an area of a receiver, such as a sheet of paper, for printing the selected digital image. Text characters are entered and handwritten alphanumeric characters are mapped to the text characters. The entered text characters are transcribed into corresponding ones of the inputted alphanumeric characters and the selected digital image and the entered text are printed on the receiver. The receiver can automatically be marked with the correct postage.

Another preferred embodiment of the present invention includes a method of producing documents comprising storing personalized digital alphanumeric characters in a digital memory accessible by a computer. Another document is opened and text is entered therein. The entered text is transcribed into the personalized digital characters to generate a personalized document which is then printed with the personalized handwriting thereon.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor limited to any combinational relationship with respect to interchangeability, substitution, or representation of an actual implementation.

DETAILED DESCRIPTION OF THE INVENTION

Figure 1A:
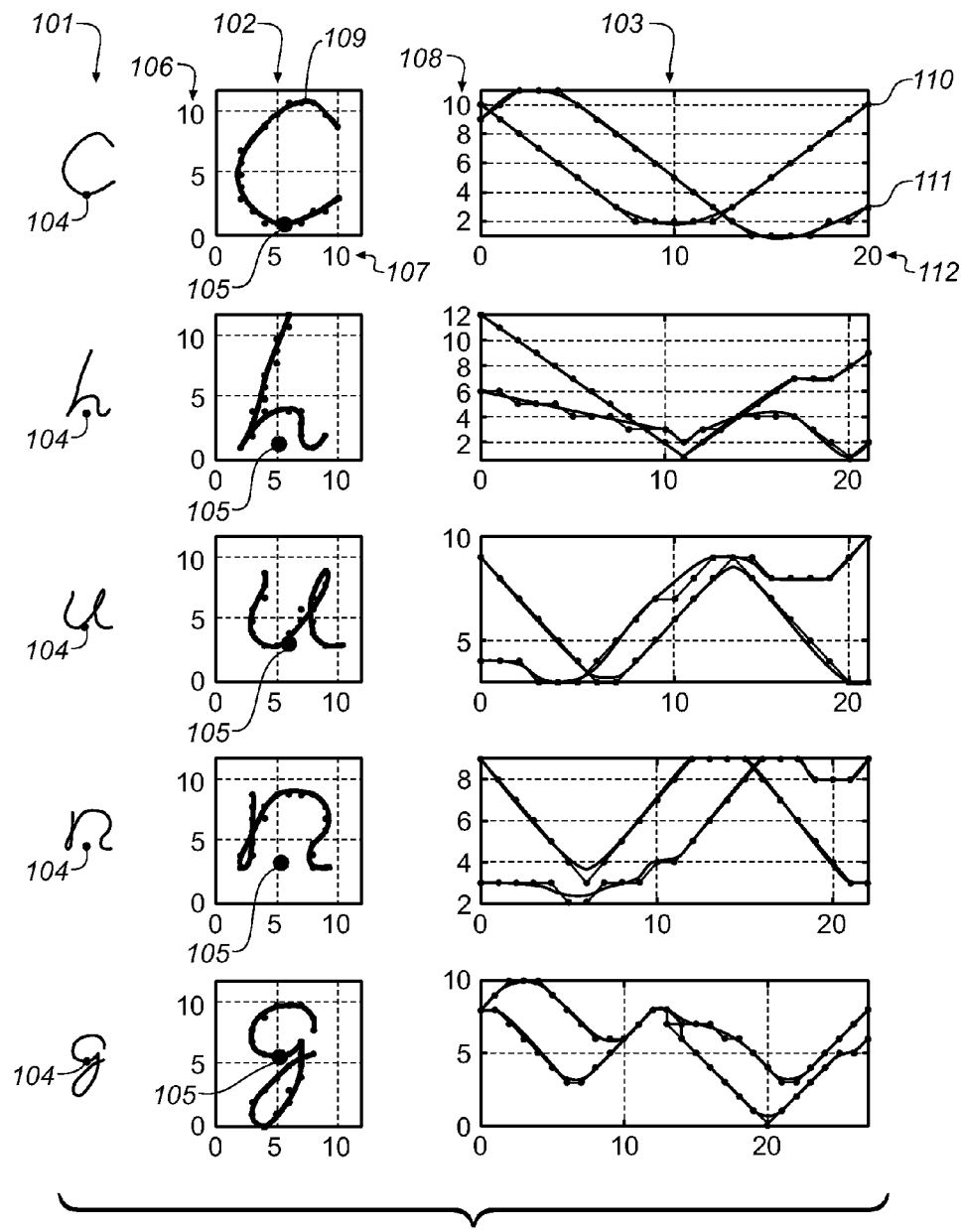
FIGS. 1A-B illustrates functional representation of hand written English letters.

Printing documents using digital means such as electrophotographic or ink jet technology requires that an appropriate image or images first be inputted into the digital print engine. This is generally accomplished by first inputting the components making up the document into a device such as a computer via use of a word processor or other user application for entering character data or image data on a document and storing the document in the computer system. This can be done using a keyboard or other device such as a scanner, translating the inputted information into a language such as Postscript that directs a printer to print the document, and then printing the document. Consider, for example, producing a document using an electrophotographic print engine. A print is typically first prepared by typing the document into a device such as a computer. The input can include alphanumeric characters characterized by the well known ASCII code that is assigned to various characters such as English characters. Drawings or other figures consisting principally of lines and shapes can also be created using known techniques. More complex images such as photographs can be printed by inputting the image into the computer. In some instances, such as when the image is in electronic format as would be the case when the image is captured using a digital camera, the image can be directly inputted into the computer and stored, for example, as a bitmap, TIFF, JPEG, or similar file. Alternatively, if the image exists as a hard copy, it can be scanned into the computer. Specific items included in the desired document, such as a signature of an individual, can also be inputted either by scanning a document with that signature and storing it as a bitmap or inputting it from a digitizing tablet, as is commonly done when printing charge card receipts at a cashier in a store.

In a typical digital print engine such as one using electrophotographic technology, a print is made by first uniformly charging a primary imaging member such as a photoreceptive member, often referred to as a photoconductor in the literature. This is usually accomplished using a grid controlled corona charger or roller charger. An electrostatic latent image is then formed on the primary imaging member. In the case of an electrophotographic print engine, this is done by imagewise exposing the primary imaging member to light, typically using a laser scanner, an LED array, or an optical exposure system.

The electrostatic latent image is next transformed into a visible image by bringing the primary imaging member into close proximity to a development station containing a developer. Typically, the developer contains marking particles, also referred to as toner or toner particles. The developer can also contain magnetic carrier particles that transport the toner particles and against which the toner particles tribocharge. Alternatively, some development stations do not contain carrier particles. These are commonly referred to as single component development stations and the developer contained therein is referred to as a single component or monocomponent developer.

After development, the visible image is transferred to a receiver such as paper. The image is then fixed to the receiver, typically by subjecting the image-bearing receiver to a combination of heat and pressure. The primary imaging member is cleaned and made ready for subsequent printing.

The information to be printed can be inputted into the printer from several sources. A document can be prepared and stored using a computer. Alpha-numeric characters are generally translated into a code such as an ASCII code corresponding to a standard set of English characters. The ASCII code is translated into a driver that addresses the writer using a postscript language. This allows the formation of an electrostatic latent image.

Alternatively, information to be printed can be fed into a computer using a scanner, digitizing tablet, or signature machine such as is commonly used to generate signatures in stores using charge card readers attached to a cash register. The inputted information can be stored in the computer in JPEG, TIFF, or BITMAP format. However, the information stored in those manners has little ability to be manipulated. This creates a problem if one wishes to input alphanumeric characters and allow them to be manipulated in a manner that would simulate a handwritten note.

However, whereas those inputs are typically directly inputted to the printing device, thereby precluding any sort of manipulation such as combining the characters in a manner to allow the creation of different sentences or allowing the positioning of the characters to allow their placement in a controlled manner chosen by the individual to create a document, it is the purpose of a preferred embodiment of the present invention to describe a method whereby those alphanumeric characters can be inputted in such a manner as to allow them to be manipulated and enable documents to be created.

In a preferred embodiment of the present invention, hand written alphanumeric characters are input into a computer using known means such as scanning and storing individual letter images using a scanner or, alternatively, inputting the characters using a digitizing tablet, or using a signature machine such as is commonly used at cash registers for customers to sign their credit card receipts. In respect of this, and with reference to FIG. 1A, a first step of a preferred embodiment of the present invention includes digitally recording a user's hand written alphabet (uppercase and lowercase), as exemplified at 101 with five letters illustrated, on a digital recording device. Preferably, the recording device includes the capability of recording the horizontal/vertical location and/or time of each written alphabet character, illustrated at 103. If the recording device is unable to capture time information, such as a flatbed scanner, the created personalized fonts can be saved in image mode. The character images provide x,y coordinates and the time axis data can then be extracted from the stored character images. The time domain axis is an arbitrary variable which, if obtained from a device capable of recording time data for hand written characters, is partially explained by the speed of the writer's hand. This data is not essential for accurately recording the shape of the hand written characters, thus, the x,y coordinates can be easily mapped to an arbitrarily generated time window. The result of the collected x,y data plotted on a time axis is shown at 103, with graph 110 displaying the x coordinates of the letter "C" and the graph 111 displaying the y coordinates thereof. Using these x,y coordinate data the character "C" can be generated as shown at 109, with the x axis values 107 and y axis values 106 of the character "C" 109 corresponding to the x coordinate data 110 and the y coordinate data 111. The following description of the present invention is directed to the example letter "C" illustrated herein, and is respectively applicable in its entirety to the four other letters "h", "u", "n", and "g" illustrated in the Figures.

Figure 1B:
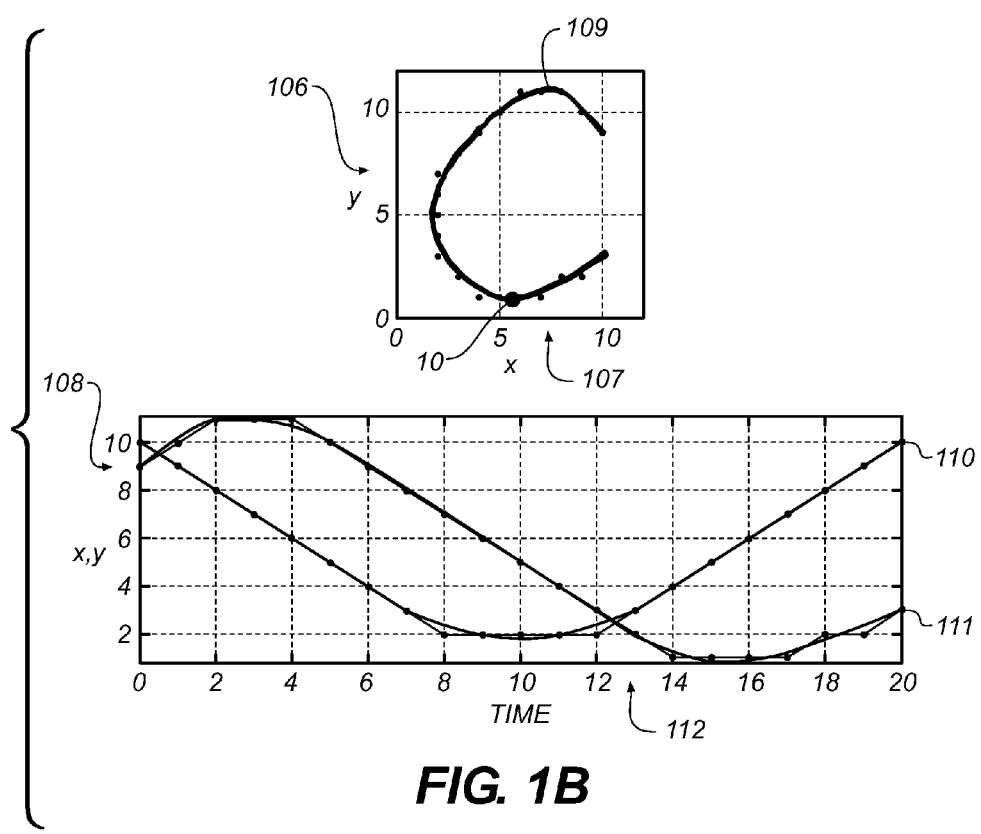

FIG. 1B shows a close-up of the mathematical representation of the letter "C" described above, with like numerals representing like elements with respect to FIG. 1A. It can be seen in the graph of FIG. 1B that there are twenty one pairs of x,y data points depicting the letter "C", each pair corresponding to a point on the data generated "C" shown above the graph. The number of data points can be arbitrarily selected or automatically generated by software.

The handwritten characters, after being inputted into the computer, can be stored in various formats such as JPEG, TIFF, or BITMAP files. The characters are then converted into mathematical algorithms as represented by the graphs 103, often referred to as vectorizing. This is accomplished by fitting the characters using infinite series. In one mode of operation, the characters are fit to a Taylor expansion series or a McClauren expansion series. Not all characters can be fit to a single mathematical function (or "functional"). For example, the letter script letter "u" has local maxima that cannot be fit to a single continuous function using an infinite polynomial series. Similarly, the letter "o" cannot be described using a single value function. In such cases, the handwritten alphanumeric characters can be fit using piecewise continuous functions each representing a portion of the letter shape. Alternatively, the x- and y-positions of all points used to describe a character can be fit using a pair of parametric equations. For example, the x- and y-displacements for each character can be described as a function of time, which would depict, using an arbitrary scale as explained above, the time needed to physically draw a character.

The mathematical functions depicted at 103 are translated into ASCII characters such as those corresponding to English characters using software that has been installed in the computer. In one mode of operation, the software can prompt the user to identify to which alphanumeric character a specific handwritten character corresponds, or the correspondence can be entered manually or installed as a predefined file. In essence, the computer should have the software that would allow the user to map the inputted alphanumeric characters into recognized fonts. Each written character is encoded by the associated functional representation.

When the computer is used in a mode where handwritten text is desired, the ASCII code translates the letter into continuous or piecewise continuous functions as previously described. Those functions then drive a writer such as an LED array or laser scanner to create the electrostatic latent image, which is then developed into a visible image, as previously discussed.

Figure 2:
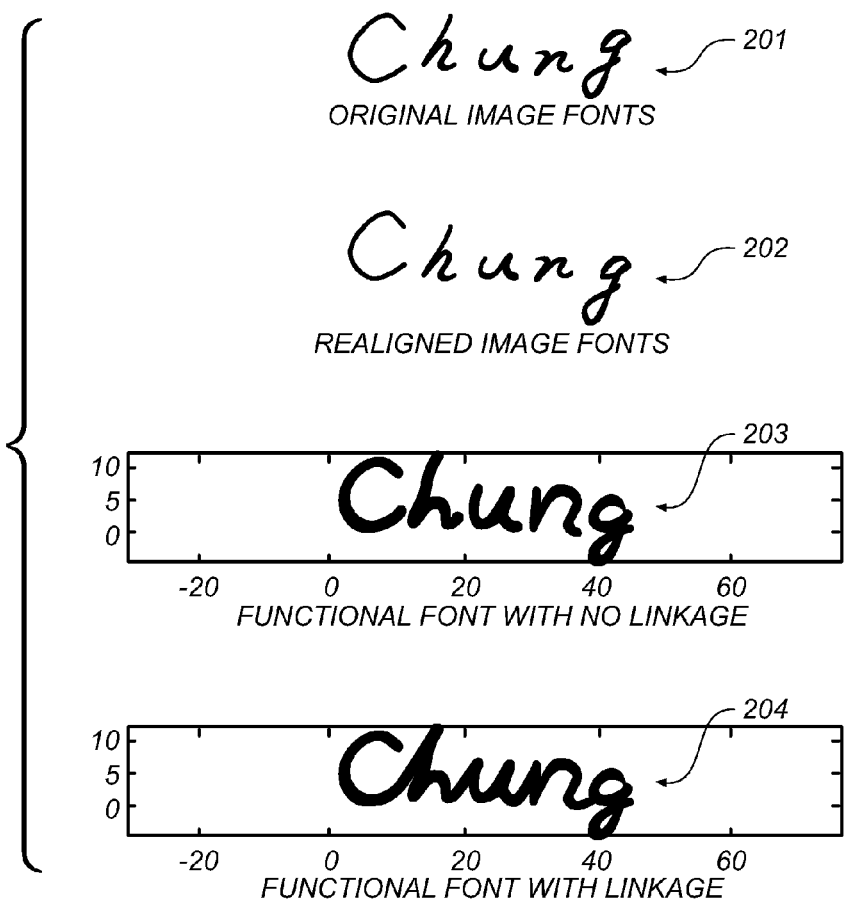
FIG. 2 illustrates the letters, printed separately, to form the name of one of the inventors in the image-mode and functional-mode.

In forming the handwritten alphanumeric fonts, for alignment purposes it is important to locate and align the position of each alphanumeric character by establishing an anchor point for each character. These anchor points, which are arbitrary, allow the characters to be aligned as exemplified in FIG. 2 by comparing alignments 201 and 202, allow multiple lines of text to be printed, and also establish the spacing between two characters. The anchor point can be readily established by mapping the area to be printed into a grid, such as defined by axes 106, 107, and assigning a point on each character 104, 105 to a point on that grid. For example, the anchor points for letters that have local minima such as the letters "c", "o", or "u" can be chosen at the minimum, i.e. the point where the first derivative of the polynomial function used to fit the character is zero and the second derivative is positive. Letters that have local maxima such as "n" or "h" can be anchored at one of those maxima. Alternatively, the anchor can be established at the midpoint of the line segment connecting the local minima, for example, at the point that is the center of the x character data and the bottom of the y character data 105. Optionally, as exemplified by the anchor point for the letter "g" of FIG. 1A, the anchor can be established at the point that is the center of the x character data and the center of the y character data. The latter method has the advantage of making the character symmetric about the anchor point, thereby facilitating fixing the character on the grid.

An anchor point will be assigned to each input alphabet with either a predefined relative position or adaptive position to align the characters. The horizontal-position/time and vertical-position/time relationship is modeled separately by a set of mathematical functionals such as 1-dimensional Spline and piecewise Taylor series. The anchor points could also be used so that the anchor points can be arbitrarily located on the page such as when a text message contains multiple lines.

Figure 4:
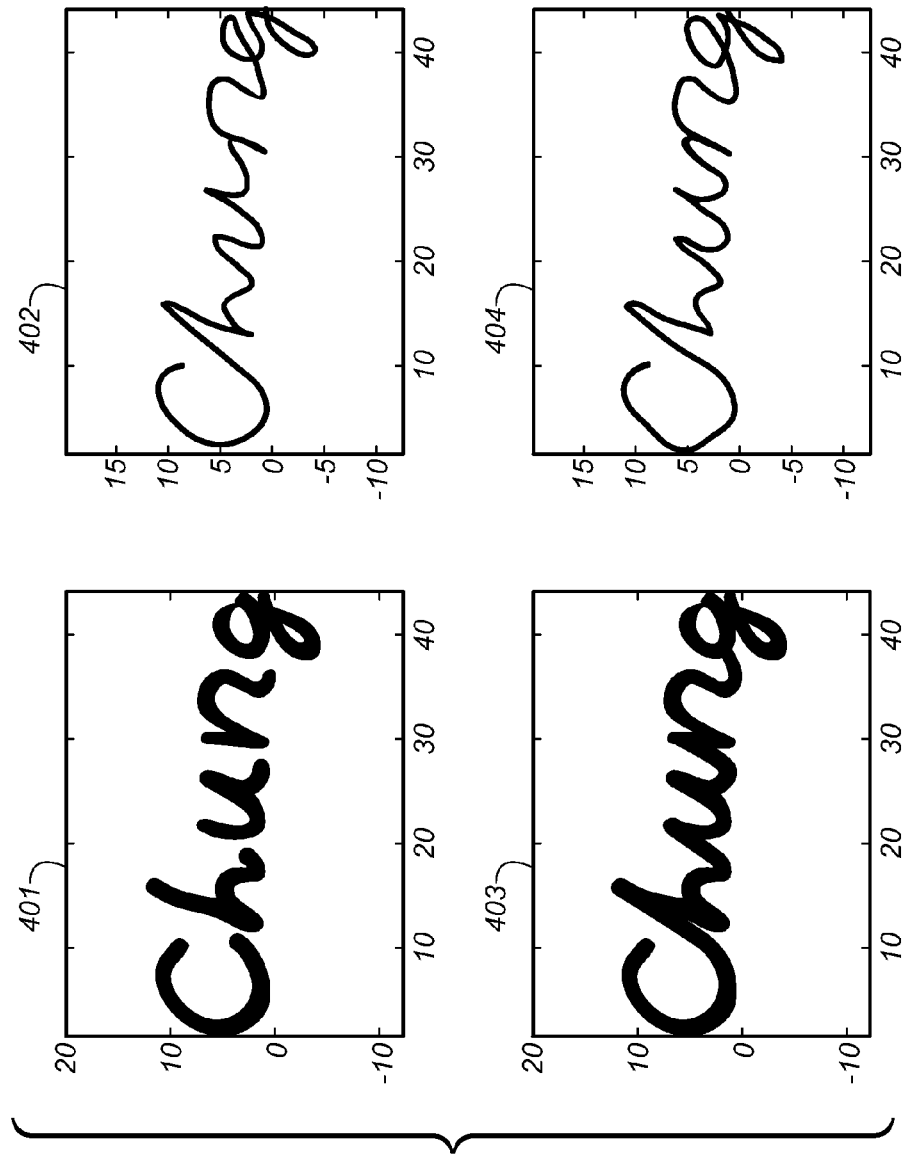
FIG. 4 illustrates the letters joined, resulting in the name being written as it would appear in cursive writing under no-linkage and auto-linkage scenarios.

The letters can be connected using spline fitting techniques as illustrated by comparison of non-linked characters 203 (FIG. 2) and 401 (FIG. 4) with linked characters 204 (FIG. 2) and 403 (FIG. 4). For example, the letters, which are fixed at an established distance from each other using the grid, can be connected using a predefined functional stored in the computer. This allows the option of either connecting letters, as would generally be desired for cursive writing, or not connecting the letters, as would be desired for manuscript or numeric input.

Figure 3:
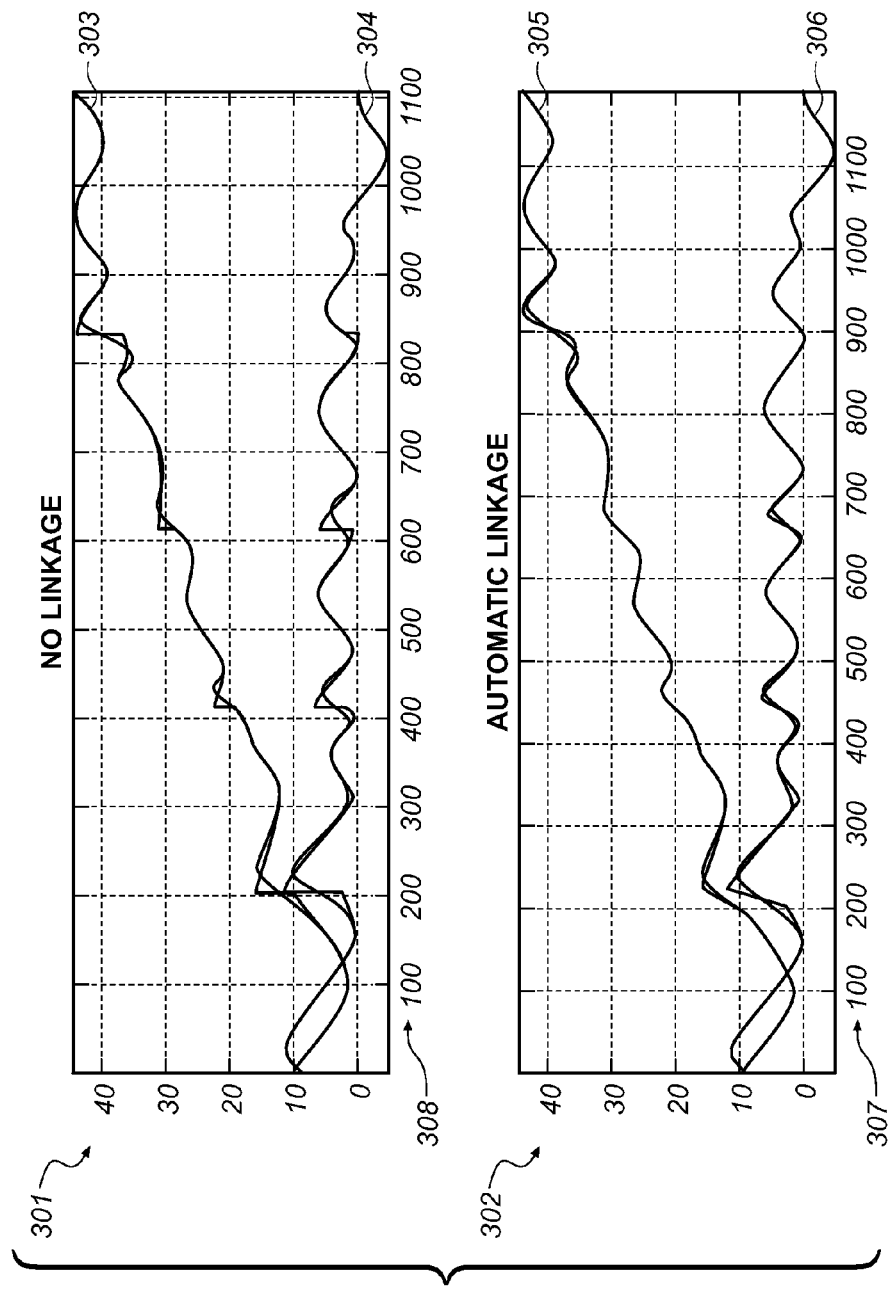
FIG. 3 illustrates post font-processing by filtering the corresponding waveforms.

A first step of a preferred embodiment for this fitting procedure includes digitally recording a user's input of hand written letters into the character generator, which can include a scanner or digitizer. In pure image mode, all input letters will be first fetched from the corresponding computer memory, re-sampled based on a required font size, and composed into the needed format. Each anchor point will be aligned along a linear direction, typically substantially horizontal. In the functional mode, users can select whether to link between consecutive letters or not. In the no-linkage case, each input letter is recreated based on the associated functional form and the intended font size. Each letter is moved to the designated location based on the desired layout format. This is illustrated in FIG. 3 at where 303 represents the x coordinates and 304 represents the y coordinates for the five letter unlinked name "Chung" 301. With reference to x axis coordinates 308 the letter "C" is illustrated by data points from 0 to about 200, the letter "h" from about 200 to 400, the letter "u" from about 400 to 600, the letter "n" from about 600 to 800, and the letter "g" from about 800 to 1000. At each letter juncture, i.e. 200, 400, 600, 800, a vertical jump in the graph indicates that the characters are non-linked characters and are "disjointed" as illustrated at 203 and 401.

In the automatic linkage case, a predefined distance is first inserted between two letters which belong to the same word. The horizontal/vertical position of the first letter is connected to the horizontal/vertical position of the second letter via a predefined functional, such as a one-dimensional polynomial. A set of boundary conditions can be imposed to optimize the linkage form, such as the continuity of the first derivative. Each completed word is then moved to the designated location based on the desired layout format. This is illustrated by the mathematical representation depicted at 302, showing that at each letter juncture, 200, 400, 600, and 800, the letter functionals are "gradually" linked by replacing the vertical jumps, shown in 301, with the predefined functionals having continuous first derivatives. Each composed word can optionally be further processed by manipulating the corresponding waveform, as illustrated at 402, 404.

A preferred embodiment of this invention is very suitable for use when producing customized documents such as picture postcards. For example, on one side of the card, a photograph can be printed either from a photograph inputted by the user into the computer or from pictures stored in the computer. The photograph can be made glossy using known glossing techniques in the electrophotographic community. On the other side of the card, names and addresses can be printed using conventional fonts to facilitate readability. In another area, small font can be used to describe the photograph. Finally, a message can be printed using the handwritten font. A preferred embodiment of the present invention is very suitable for mailing multiple cards to different individuals or addresses using known software features such as mail merge. Finally, postage can be metered onto the card, either downloaded from a source such as the post office or from postage metering software in the computer. For some applications, the card can be composed in one location and printed and mailed in another. For example, a user overseas can compose a picture postcard, but have it printed at another site in proximity to the address to which it is being sent. This can reduce delivery time and postal costs.

A preferred embodiment of the present invention is particularly suited for allowing documents to be printed in a predetermined form or template. For example, a picture postcard typically has a photograph or picture on one side. On the opposite side, the right half is reserved for address information. Postage is at the upper right corner. On the left, near the top, in small fonts, is a description of the picture. Below is the handwritten message. Preformed templates can be stored in the computer that facilitate the formation and printing of such documents.

The invention claimed is:

1. A computer implemented method of producing personalized documents comprising:
   inputting handwritten alphanumeric characters;
   using the computer to map the inputted characters into at least one set of text characters, wherein the mapping is done by converting the inputted alphanumeric characters into mathematical functions approximating a shape of each inputted alphanumeric character;
   entering a textual document into the computer;
   transcribing the textual document into a set of text characters corresponding to the inputted alphanumeric characters; and
   printing the transcribed textural document.

2. The method of claim 1 wherein the step of inputting includes scanning.

3. The method of claim 1 wherein the step of entering includes opening a file stored in a memory accessible by the computer, wherein the file includes text characters.

4. The method of claim 1 wherein the set of text characters is a standard English set of ASCII characters.

5. The method of claim 1 wherein the inputted alphanumeric characters are stored in a format selected from the group consisting of JPEG, TIFF, and a bitmap.

6. The method of claim 1 wherein the step of inputting is performed by a signature machine.

7. The method of claim 1 wherein the step of inputting includes digitizing performed by a digitizing tablet.

8. The method of claim 1, wherein the mathematical function is selected from the group consisting of a Taylor Series and a McLauren Series or a piecewise continuous Taylor Series and a piecewise continuous McLauren Series.

9. A method according to claim 1 further comprising modifying the transcribed set of characters for printing, including the step of spline fitting the mathematical functions of each of the mapped text characters.

10. A method of producing documents comprising:
    storing personalized digital alphanumeric characters in a digital memory accessible by a computer, wherein each of the personalized digital alphanumeric characters is represented using spline fitting functions;
    opening a preformatted document stored on the computer;
    entering text in the preformatted document;
    transcribing the text entered in the preformatted document into the personalized digital characters to generate a personalized document; and
    printing the personalized document.

11. The method of claim 10 further comprising:
    mapping the stored personalized digital characters into a set of text characters; and
    wherein the step of transcribing includes the step of transcribing the text entered in the preformatted document into the set of text characters mapped from the personalized digital characters.

12. The method of claim 10 wherein the step of printing comprises printing the transcribed personalized digital characters on a first side of the personalized document and printing a stored digital image on a second side of the personalized document.

13. The method of claim 10 wherein the step of storing includes storing the personalized digital alphanumeric characters in a format selected from JPEG, TIFF, and a bitmap.

* * * * *